PROBE DEVICE

Filed June 15, 1960

INVENTORS
Edward N. Burnett
Ralph C. Cross
Leon G. Tuttle
BY
Townsend and Townsend
attorneys

1

3,040,909

PROBE DEVICE

Edward N. Burnett, Fremont, Mich., and Ralph C. Cross and Leon G. Tuttle, Rochester, N.Y., assignors to Gerber Products Company, Fremont, Mich., a corporation of Michigan Filed June 15, 1960, Ser. No. 36,322
3 Claims. (Cl. 214—1)

This invention relates to new and useful switch actuating devices and, more particularly, to new and useful probes for actuating the switch of a magnetic transfer machine.

In many food production lines transfer apparatus of the type having an electromagnetic pickup head is employed to move containers from one location to another in the line. The pickup head becomes energized upon contact with a group of containers. The containers are then raised by the head which pivots horizontally about its axis and delivers the jars to their discharge station. Such transfer devices have been found particularly useful by baby food packagers, who utilize glass jars of the type having metal caps.

One of the prior art transfer machines with which we are familiar is pivotally supported for rotation in a horizontal plane between an accumulating disk and an unloading station or retort crate. The magnetic head is vertically movable into physical contact with a group of jars on the disk, and after the head comes to rest on the jars, the supporting mechanism continues its downward movement relative to the head for a short distance. This relative movement of the supporting mechanism and the pickup head causes a projection from the magnet to trip a microswitch mounted on the support mechanism. The switch stops all motion of the head, energizes the magnet and starts it on its transfer cycle with its load of jars. At the discharge location after the bottoms of the jars come to rest on the unloading platform, the microswitch is again actuated stopping movement of the head and de-energizing it to release the jars.

Because of manufacturing tolerance, the containers lack uniformity in height making the above described transfer operation unsatisfactory. More particularly, when the head of the magnet comes into contact with the tops of the jars on the disk, the taller jars absorb the full weight of the head which otherwise would be uniformly distributed throughout the entire group of jars, normally several dozen in number. This concentration of force often results in jar breakage or the gasket material between the cap of the jar is ruptured causing the product to spoil.

Accordingly, it is a principal object of the within invention to prevent jar breakage and rupture of the jar sealing material by the pickup head in the transfer operation. This object is accomplished by providing means for the transfer machine which will sense the position of the downwardly moving pickup head relative to the accumulating disk and deliver this information to the pickup head actuating means in time to prevent any weight of the pickup head from coming to rest against the jars on the disk.

In the preferred embodiment of the invention a probe is connected to a microswitch mounted on the pickup head. The probe projects vertically through an aperture formed in the center of the head and extends below the loading surface of the head. When the pickup head is actuated toward the accumulating disk, the probe will contact the surface of the disk proximate the center thereof. The head continues toward the disk causing the probe to throw the switch mounted on the head. Downward movement of the head is then brought to a stop before any weight comes to rest on the top of the jars. The switch is in a circuit with means to energize the magnet and to

2 control movement of the head so that after the head comes to a stop and picks up the jars, it proceeds to the unloading station. At the unloading station the probe again actuates the microswitch, and the jars are released a slight distance above the surface of the station.

A feature and advantage of the present invention is that the probe includes adjustment means to vary the length of the probe and bring it into adjustment with jars of different heights. More particularly, an extension member is affixed to the lower end of the probe and is movable to various positions on the probe shaft.

Another feature and advantage of the within invention pertains to means for returning the probe to its normal position when the probe is out of engagement with the accumulating disk or the unloading station. For this purpose, a spring is mounted around the shaft of the probe with one end anchored to the probe and the other end secured to the pickup head. When the lower end of the probe contacts a station surface, the pickup head, carrying the microswitch, continues downwardly a short distance compressing the spring and simultaneously causing the switch to be thrown. Then, as the pickup head commences its upstroke, spring expansion causes the head to move relative to the probe until the probe occupies its normal position with respect to the head.

It is noted that one of the specific features of this invention is in the provision of the present probe device in combination with a hollow circular blocking member supported on the accumulating disk and surrounding the area of contact by the probe to prevent articles and foreign matter from interfering with the operation of the probe in stopping the downward movement of the pickup head immediately adjacent the tops of the containers.

Other objects of the invention will become apparent upon reading the following specification and referring to the accompanying drawings in which similar characters of reference represent corresponding parts in each of the several views.

Figure 1:
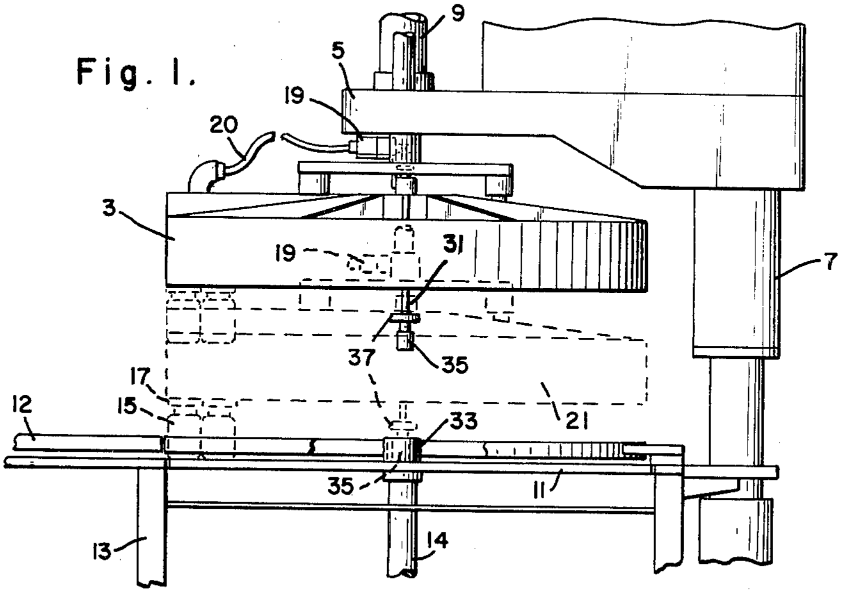
FIG. 1 is a side elevational view of a magnetic transfer machine modified with a device according to the present invention.

Referring now more particularly to the drawings, in FIG. 1 there is illustrated a magnetic transfer machine of the type employing an electromagnetic pickup head 3. Magnetic pickup head 3 is supported from hydraulic cylinder 9 and the hydraulic cylinder 9 is supported by horizontal arm 5 which in turn is affixed to a primary support 7. Generally, the head 3 may be actuated vertically toward and away from a container loading station or accumulating disk 11, and also includes means (not shown) for horizontal pivotal movement to transfer articles from the disk to an unloading station.

The accumulating disk 11, which may be supported either by legs 13 or a rotating shaft 14, is circular in shape and in vertical alignment with the pickup head. Jars or containers, such as those indicated by the dotted lines at 15 having metal caps 17, are arranged to flow from a conveyor belt circularly onto the disk guided by retaining ring 12, which surrounds the outer periphery of the disk. When the disk is filled, the containers are ready to be loaded and transferred by the pickup head.

For actuating the pickup head through its transfer cycle, a micro-precision limit switch 19 is provided. This switch is mounted on a bracket 23 anchored to a tubular sleeve 25, which in turn is fitted into a recess formed in the top of the pickup head 3. The switch 19 is wired, as at 20, to the pickup head 3 and other means (not shown) to control the coil magnetic head and a solenoid-operated hydraulic power system. However, except for the switch-actuating device, which will be fully described hereinafter, the circuit and power system may be according to any suitable arrangement which is within the knowledge of those skilled in the art.

Figure 2:
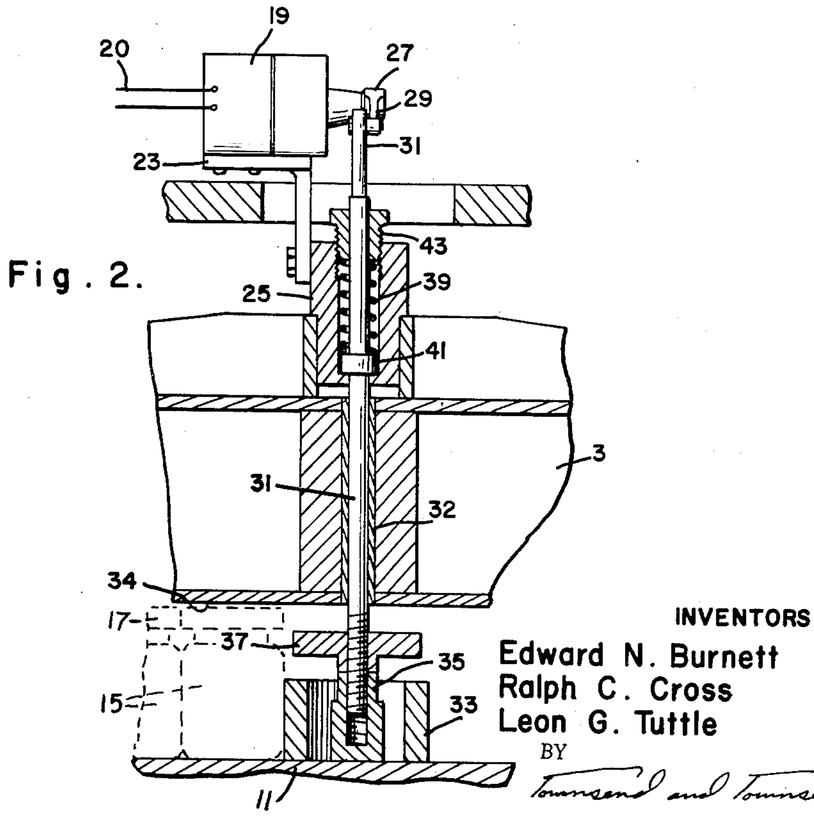
FIG. 2 is an enlarged view of the apparatus of FIG. 1 partially broken away and showing the details of the probe and associated apparatus.

As best seen in FIG. 2, the switch assembly includes an arm 27 which extends horizontally from the switch box. This arm is rotatable, and when a vertical force is applied to the outer end 29 of the arm, the switch is thrown. A sensing device or probe 31 is connected to the outer end of the switch arm 27 and extends through an aperture in the center of pickup head 3, which aperture is provided with a lining member 32. The lower end of the probe 31 projects beyond the face 34 of the head and is vertically aligned with the central portion of the accumulating disk 11.

The probe 31, arranged as described, will strike the center of the disk when the head is on its downstroke causing the switch arm to become actuated. One of the reasons for centrally mounting the probe with reference to the head and disk is that the function of the probe will be virtually uneffected at this location should the head move out of parallel alignment with the disk. Another reason is to prevent obstruction of the natural flow of jars onto the accumulating disk.

The central area of the disk may be reserved for contact with the probe by a circular sleeve 33 secured to the disk. This member 33 forms a stop to restrict the jars to the area between the sleeve and the retaining wall 12.

The probe 31 also includes a piece of round stock 35 threadedly engaging the end of the probe and dimensioned to fit within circular sleeve 33. This member 35 serves as a means of adjustment for varying the length of the probe according to the height of the jars on the disk and is co-operable with a lock nut 37 to maintain it in fixed position after adjustment is made.

The probe 31, mounted as described, moves vertically with the pickup head 3 until member 35 engages the surface of the accumulating disk 11. The head continues downward movement relative to the probe causing switch arm 27 to rotate. This energizes the pickup head and stops downward movement, at the position indicated by the dotted lines at 21 in FIG. 1, a position approximately ⅛ of an inch above the top of containers 15. Magnetic force draws the containers up onto the face 34 of the head, which then starts its upstroke.

For returning the probe to the position it occupies in relation to the pickup head before contact with the accumulating disk, a return spring 39 is supplied. One end of this spring is anchored to a collar 41 integral with the probe, and the other end is secured to a bushing 43 attached to sleeve 25. The spring will compress when the head moves downwardly in relation to the probe and will decompress returning the probe to its down position when the head moves upward from disk 11.

In the overall operation of the transfer machine, jars 15 are accumulated on disk 11. The magnetic pickup head 3 then starts its downstroke toward the jars. The probe 31 strikes the accumulating disk and actuates the switch 19 approximately ⅛ of an inch before the head reaches the jars. This causes the pickup head to become energized and stops the hydraulic pump motor that supplies cylinder 9 preventing any weight of the head from coming to rest on top of the jars. Following this sequence, the hydraulic cylinder 9 raises the pickup head and starts it on its trip to the unloading station or retort crate where the jars are to be discharged. The discharge phase of the machine is similar to the loading phase with the exception that when the probe strikes the surface of the unloading station, the head becomes de-energized and stops its downward movement to release the jars approximately ⅛ of an inch above the discharge surface. The head then moves toward the accumulating disk to receive another load of jars.

Although the foregoing invention has been described in some detail by way of illustration and example for purposes of clarity of understanding, it is understood that certain changes and modifications may be practiced within the spirit of the invention and scope of the appended claims.

We claim:

1. In combination with a transfer machine of the type having a mechanical pickup assembly movable to raise from a transfer station a plurality of articles the improvements comprising: a switch supported by a pickup head for movement therewith and operable to activate said pickup head; a transfer station for supporting in vertical alignment with the pickup head a plurality of articles of non-uniform height; a probe mounted through the center of the pickup head and axially movable relative thereto, said probe having an upper end connected to said switch and a lower end extending below the margin of the pickup head; isolation means on said transfer station for creating a reserved area on said transfer station for contact by said probe; said reserved area engaged by said probe when the pickup head reaches a predetermined position relative to the articles loaded on said transfer station to operate said switch whereby the pickup head is energized and downward movement stopped prior to pressure contact of the head with said articles.

2. A combination according to claim 1 wherein said isolation means comprises a circular sleeve located at the center of said transfer station.

3. A combination according to claim 1 wherein the pickup head and probe are provided with spring means for returning said probe to a normal position after elevation of the probe from transfer station contact, and wherein said probe is provided with screw means at its lower end for varying the length of the probe.

References Cited in the file of this patent

UNITED STATES PATENTS

| | | |
|---|---|---|
| 2,007,592 | Beeson | July 9, 1935 |
| 2,609,108 | Peterson | Sept. 2, 1952 |
| 2,809,769 | Clarke | Oct. 15, 1957 |
| 2,819,806 | Vieth | Jan. 14, 1958 |